(12) United States Patent
Hertzmann et al.

(10) Patent No.: US 10,032,092 B2
(45) Date of Patent: Jul. 24, 2018

(54) TRAINING DATA TO INCREASE PIXEL LABELING ACCURACY

(71) Applicant: Adobe Systems Incorporated, San Jose, CA (US)

(72) Inventors: Aaron P. Hertzmann, San Francisco, CA (US); Saining Xie, La Jolla, CA (US); Bryan C. Russell, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/013,641

(22) Filed: Feb. 2, 2016

(65) Prior Publication Data

US 2017/0220903 A1    Aug. 3, 2017

(51) Int. Cl.
*G06K 9/62* (2006.01)
*G06K 9/66* (2006.01)
*G06T 7/00* (2017.01)

(52) U.S. Cl.
CPC ......... *G06K 9/6254* (2013.01); *G06K 9/6256* (2013.01); *G06K 9/66* (2013.01); *G06T 7/0081* (2013.01); *G06T 2207/20144* (2013.01)

(58) Field of Classification Search
CPC ...... G06K 9/6254; G06K 9/66; G06K 9/6256; G06T 7/0081; G06T 2207/20144
See application file for complete search history.

(56) References Cited

PUBLICATIONS

Jaimes, A., and S. F. Chang. "Concepts and Techniques for Indexing Visual Semantics, book chapter in Image Databases, Search and Retrieval of Digital Imagery, edited by V. Castelli and L. Bergman." Castelli and L. Bergman(2002).*
Maire, Michael, X. Yu Stella, and Pietro Perona. "Hierarchical Scene Annotation." BMVC. 2013.*

* cited by examiner

*Primary Examiner* — Bhavesh Mehta
*Assistant Examiner* — Menatoallah Youssef
(74) *Attorney, Agent, or Firm* — Wolfe-SBMC

(57) ABSTRACT

Techniques are described to generate improved training data for pixel labeling. To generate training data, objects are displayed in a user interface by a computing device, e.g., iteratively. The objects are taken from a structured object representation associated with a respective one of a plurality of images. The structured object representation defines a hierarchical relationship of the objects within the respective image. Inputs are then received that are originated through user interaction with the user interface. The inputs label respective ones of the iteratively displayed objects, e.g., as text, a graphical element, background, foreground, and so forth. A model is trained by the computing device using machine learning.

19 Claims, 8 Drawing Sheets

TRAINING DATA TO INCREASE PIXEL LABELING ACCURACY

BACKGROUND

Pixel labeling is typically used to indicate "what is being described" by a respective pixel. For example, pixel labeling may be used to indicate whether a pixel is included in a foreground or background of an image. Pixel labeling may also be used to describe an object that includes the pixel (e.g., text, a person, or other object or graphic elements). The labeling of the pixels may be used to support a variety of functionality, such as object removal to remove those pixels that correspond with a particular object, optical character recognition in which pixels are processed that are labeled as corresponding to text, auto layer separation in which different layers are formed from an image for each object included in the image to ease editing of the image, and so forth.

One technique that is used to perform pixel labeling involves use of a model generated through machine learning. Machine learning is used to train the model by using training data that includes images and labeled objects, e.g., text, foreground, and so forth. In this way, the model is trained by learning patterns as to which pixels represent the labeled objects in the training data.

Conventional techniques used to form the training data, however, often include inaccuracies that are then propagated to the model, and thus result in inaccuracies of the model itself. For example, one such conventional technique requires users to manually label the objects in the images by manually defining a border of the objects within the images. Thus, this training data is dependent on the user's manual dexterity in defining the border (e.g., in drawing the border using a tool similar to a pencil in a user interface). Accordingly, this manually drawn border may include pixels that are not actually considered part of an object being defined, and thus may cause inaccurate training of the model based on inaccurate labeling of those pixels. Further, defining a border in such a manner may take a significant amount of time, and thus sets of training data may be limited by a number of examples that are made available. Such limited training data may also limit the accuracy of the model that is trained using this data. As a result, a significant expense to obtain a sufficient number of examples may be required.

SUMMARY

Techniques to improve training data for use in pixel labeling are described. To generate training data, images are employed having structured object representations, respectively. Structured object representations describe each object within an image and the pixels that are used to render that object in a user interface. Examples of images having structured object representations include images configured as a scalable vector graphic (SVG), images configured in accordance with a portable document format (PDF), or images using hypertext markup language (HTML). Thus, images having a structured object representation are readily available and provide an accurate correspondence between pixels and a corresponding object in the image.

In order to label objects and corresponding pixels of the objects, objects are first selected from the structured object representation and rendered for display in a user interface. An input is then received to label the object, and thus pixels within the object. An example of this includes user selection of one of a plurality of preconfigured label options, such as buttons in the user interface to label text, a graphical element, background, foreground, and so forth. This process may be repeated (e.g., iterate) for display of successive objects from the image as well as other images to receive inputs labelling those object and thus the corresponding pixels. In this way, a variety of labels may be assigned to objects and therefore pixels of the objects in an efficient and accurate manner to form a training set of labeled images.

The training set is then used to form a model using machine learning to label pixels in subsequent images. For example, machine learning may be used in which a neural network trains a model to learn which patterns of pixels correspond to particular labels based on the labeled images of the training set. Accordingly, the model is provided with training set having increased labeling accuracy as well as an increased number of examples over conventional techniques, thereby improving accuracy of the model itself.

The trained model is then used to label pixels in subsequent images that are not used as part of the training, such as bitmaps that do not have corresponding structured object representations. The labeled pixels in the image are usable to support a variety of different types of image processing techniques which also have increased accuracy due to the increased accuracy of the model, examples of which include optical character recognition, automatic layer separation to ease image editing functionality, and so forth. For example, automatic layer separation may be used to separate a foreground layer of an image from a background layer of the image to support individual editing of the layers. A variety of other examples are also described in the following.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
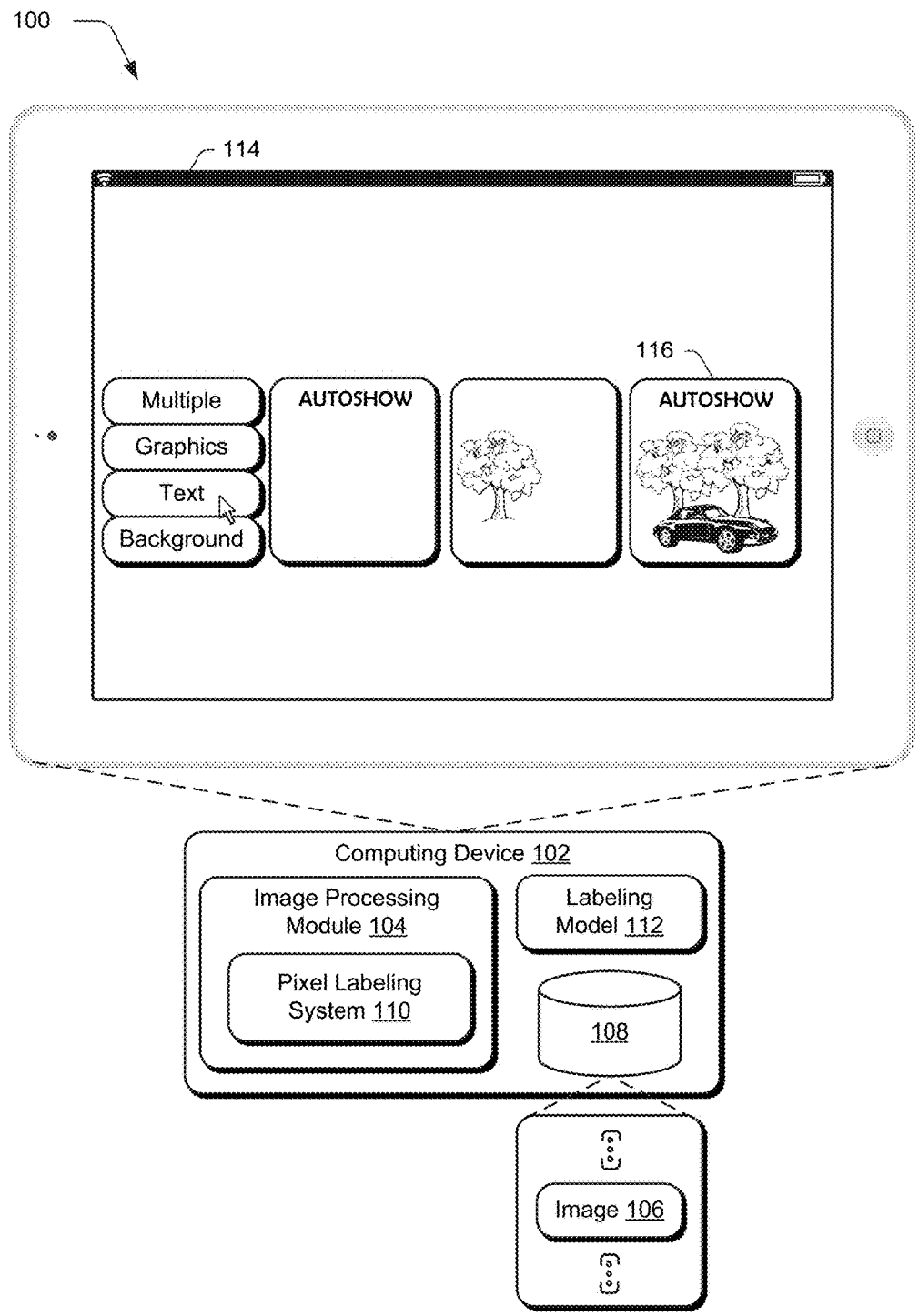
FIG. 1 is an illustration of an environment in an example implementation that is operable to employ pixel labeling techniques described herein.

Labeling of pixels in an image may be used to support a variety of functionality by knowing "what" is being represented by the pixel. Training data used by conventional techniques to do so, however, typically introduces a variety of errors that may lead to inaccurate labeling of the pixels. In one such example, manual labeling of objects within the images relies on manual dexterity of a user to define a border of the object to be labelled. Accordingly, inaccuracies of this manual labeling may introduce pixels should not have a label (e.g., are not included as part of the object) as well as miss pixels that should have the label, e.g., are to be included as part of the object.

A user circling text to be labeled as such within an image, for instance, may include portions of the text as well as a portion of a background of the image due to difficulty in accurately defining a manually-drawn border around this text. Accordingly, a model generated from conventional training data to label pixels could be inaccurate based on the inaccuracy of these pixels that are used to train the model. Further, this leads to another factor that may introduce errors in training of the model, which is a limited availability of training images due to an amount of time and thus corresponding expense in having users manually define the border and corresponding label.

Techniques to improve training data used to train models to label pixels are described in the following. Training images are obtained that have an associated structured object representation. The structured object representation, for instance, may describe a hierarchical arrangement of objects within an image, such as through use of a tree node that has child nodes that define parts to the tree such as leaves, trunk, roots, and so on. Examples of structured object representations include a scalable vector graphic (SVG), hypertext markup language (HTML), portable document format (PDF), and so forth. Thus, these images are readily available for minimal expense.

The structured object representation is leveraged to form training data having improved accuracy over conventional techniques. For example, objects from the structured object representation are sequentially displayed one after another in a user interface (i.e., iteratively), which may be selected automatically by a computing device by "walking" the representation or manually based on input by a user. An object that includes one or more alphanumeric characters, for instance, may be selected from the representation and displayed in a user interface. Because the object is selected from the structured object representation, just the pixels that correspond to the object are displayed which increases accuracy and efficiency over conventional techniques that involve a manually-drawn border.

A user may then select from a plurality of options to assign a label to this object, e.g., text in this instance. That label is then associated with each of the pixels that correspond to the displayed object as indicated by the structured object representation. The output and labeling of the object may continue for other objects within the image as well as other objects for other images, i.e., iterates over the objects in the image and well as over other images. In this way, a user may efficiently and accurately label pixels in images by leveraging the structured object representation.

These labeled images are then used to train a model using machine learning. For example, a neural network is trained using the images to learn which labels correspond to which pixels by learning patterns from the labeled pixels. As the training data exhibits increased accuracy over conventional training data, so too does a model trained using this data. The model, once trained, may then be used to label pixels in an image automatically and without user intervention, even for bitmap images that do not include structured object representations.

The pixels, once labeled, may also support a variety of functionality. Examples of this functionality include object removal to remove those pixels that correspond with a particular object, optical character recognition in which pixels are processed that are labeled as corresponding to text, auto layer separation in which different layers are formed from an image for each object included in the image to ease editing of the image, and so forth. For example, auto layer separation may be used based on an identification of which pixels are labelled as corresponding to a foreground and which pixels are labelled as corresponding to a background. These pixels may then be assigned separate layers to support editing, such as to replace a background with another background, object removal, and so forth. In this way, increased accuracy and efficiency of these techniques also supports increased accuracy of a model to label pixels as well as increased accuracy in other image processing techniques that rely on this labeling. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ pixel labeling techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The computing device 102 is illustrated as including an image processing module 104. The image processing module 104 is representative of functionality to process images 106, which are illustrated as stored in storage 108 of the computing device 102. The images 106 are representative of one or more images and thus the following discussion may reference to the images in singular or plural form, e.g., image 106 or images 106. This functionality includes creation of images 106 as well as modification of existing images to arrive at the transformed image. This also includes processing of images to identify what the image contains, e.g., what objects are included in the image.

An example system performing this functionality is illustrated as a pixel labeling system 110. The pixel labeling system 110 is representative of a system performing an example functionality to assign labels to individual pixels within an example image 106. A label, for instance, may describe "what" is being represented by the pixel, e.g., foreground, background, particular type of objects such as text, and so forth.

In order to assign labels to pixels of the image 106, a labeling model 112 is used to recognize patterns in the pixels that are indicative of labels that are assigned to those pixels. In order to recognize these patterns, the labeling model 112 is first trained using training images as part of machine learning, e.g., through processing by a neural network to recognize which patterns in the training images correspond to which labels in the training images.

As previously described, however, conventional training data often includes inaccuracies and is expensive due to reliance on a manually-drawn border by a user to identify particular pixels that are then labeled by the user. In the techniques described herein, however, a user interface 116 is employed to output individual objects taken from a structured object representation of an image and thus does not rely on a manually drawn border. A user then selects from one or more of a plurality of labels to be assigned to individual pixels of the object. In this way, a user may assign labels to pixels of objects without manually-drawing a border in an accurate, efficient, and cost effective manner by leveraging a wide availability of images having structured object representations. An example of this is further described in relation to FIGS. 2 and 3 in the following.

Figure 2:
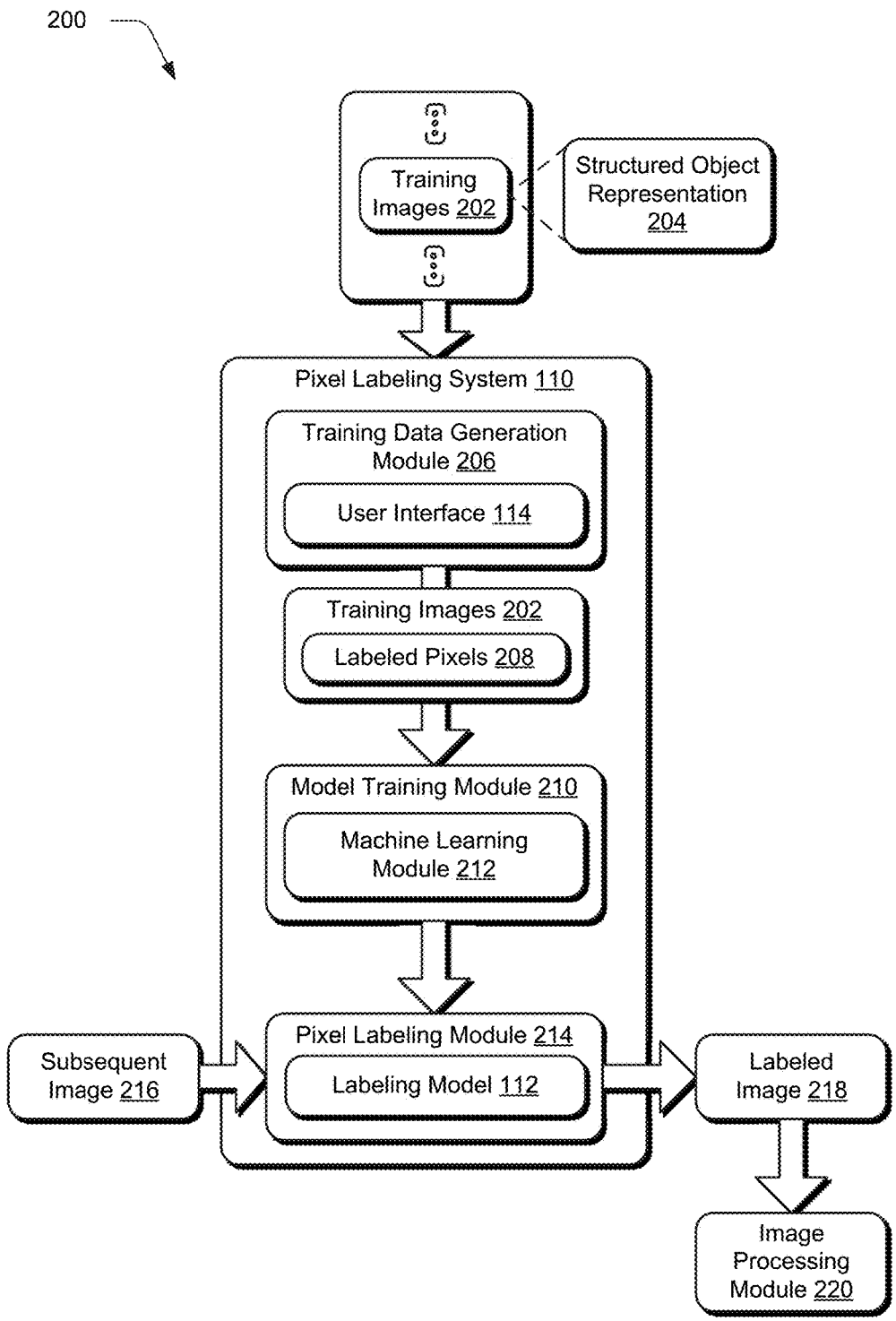
FIG. 2 depicts a system in an example implementation in which a pixel labeling system of FIG. 1 is shown in greater detail.
Figure 3:
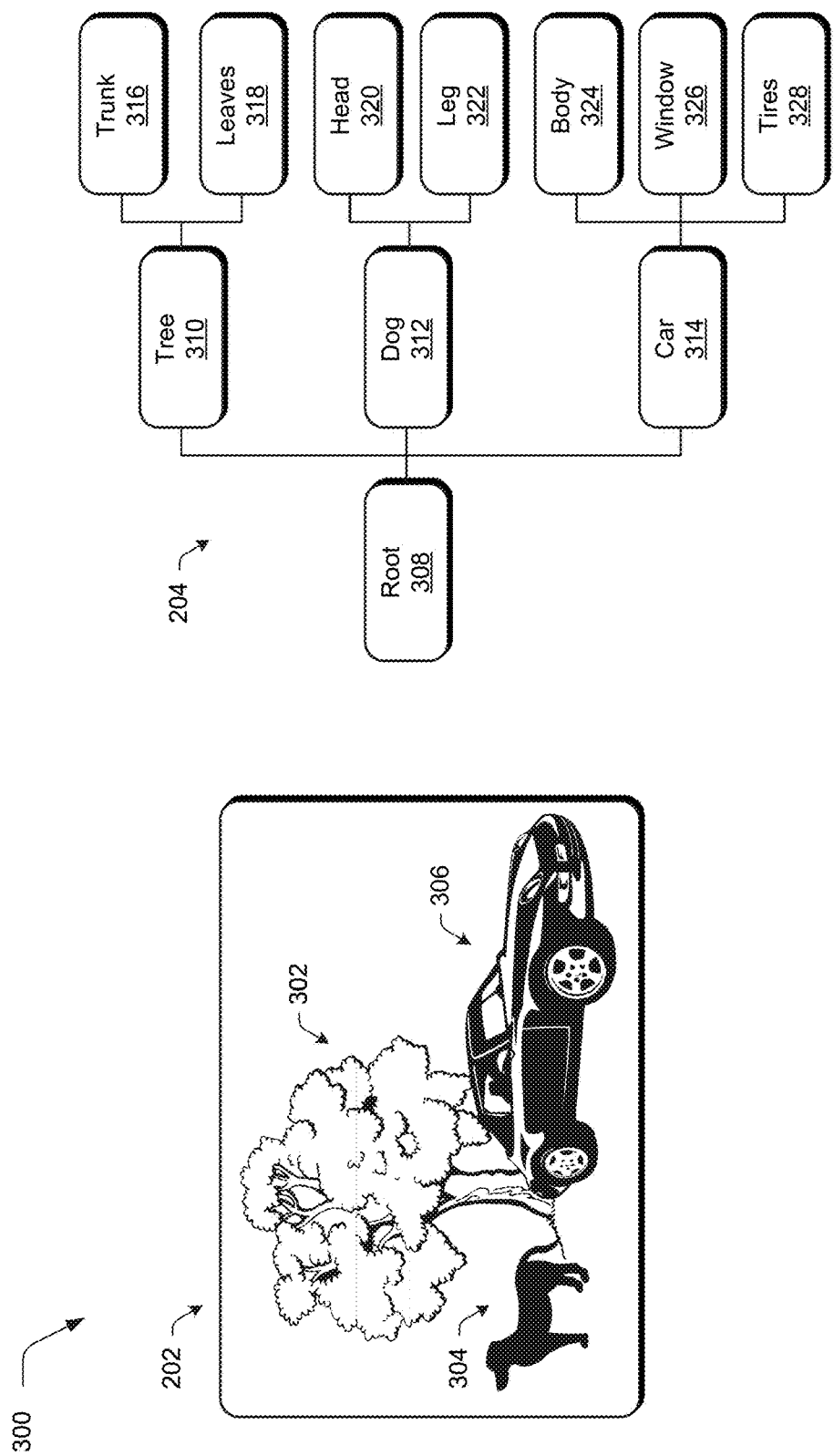
FIG. 3 depicts an example of an image and a structured object representation associated with the image that are used as a basis for training a model using machine learning.

FIG. 2 depicts a system 200 in an example implementation in which the pixel labeling system 110 is shown in greater detail. In this example, the pixel labeling system 110 first receives training images 202 having a structured object representation 204 that describes a relationship of objects within respective images to each other. Training images 202 having structured object representations are readily available, examples of which include a scalable vector graphic (SVG), hypertext markup language (HTML), portable document format (PDF), and so forth. An example 300 of this is shown in FIG. 3. A training image 202 in this example includes a tree 302, a dog 304, and a car 304. A structured object representation 204 is included as part of the image 202 and describes a relationship of these objects and well as parts of the objects (i.e., sub-objects) to each other, which may be used to describe how to render the image 202. The structured object representation 204 may be implemented in a variety of ways, such as through use of a markup language, graph, scalable vector graphic (SVG), hypertext markup language (HTML), portable document format (PDF), and so forth.

The structured object representation 204, for instance, includes a root 308 node and a plurality of other nodes, illustrated as boxes, that are connected in a hierarchical relationship. Accordingly, the structured object representation 204 includes a tree 310, dog 312, and car 314 nodes that are each "children" of the root 308 node and thus define a second hierarchical level of the structured object representation 204 after a first hierarchical level that includes the root 308 node.

A third hierarchical level is also illustrated having nodes that are children of respective nodes of the second hierarchical level. The tree 310 node, for instance, includes a trunk 316 node and a leaves node 318 that define objects, which together, form the tree 302 and thus depend from the tree 310 node. Likewise, a head 320 node and a leg 322 node depend from a dog 312 node and a body 324 node, window 326 node, and tires 328 node depend from the car 314 node to further define the third hierarchical level. The process may continue to further define each of the objects.

In this way, the nodes of the structured object representation 204 define pixels as relating to specific objects that are rendered as part of the image 202. The pixel labeling system 110 then leverages this correspondence of pixels to defined objects within the structured object representation 204 to increase efficiency and accuracy of model training as described in greater detail in the following.

Returning to FIG. 2, a training data generation module 206 of the pixel labeling system 110 obtains the training images 202 and associated structured object representation 204. The training data generation module 206 is implemented at least partially in hardware as logic to generate training data from the training images 202 having labeled pixels 208 that is to be used as a basis to train the labeling model 112 using machine learning. To do so, the training data generation module 206 employs a user interface 114 that is configured to leverage the structured object representation 204 associated with the training images 202.

Figure 4:
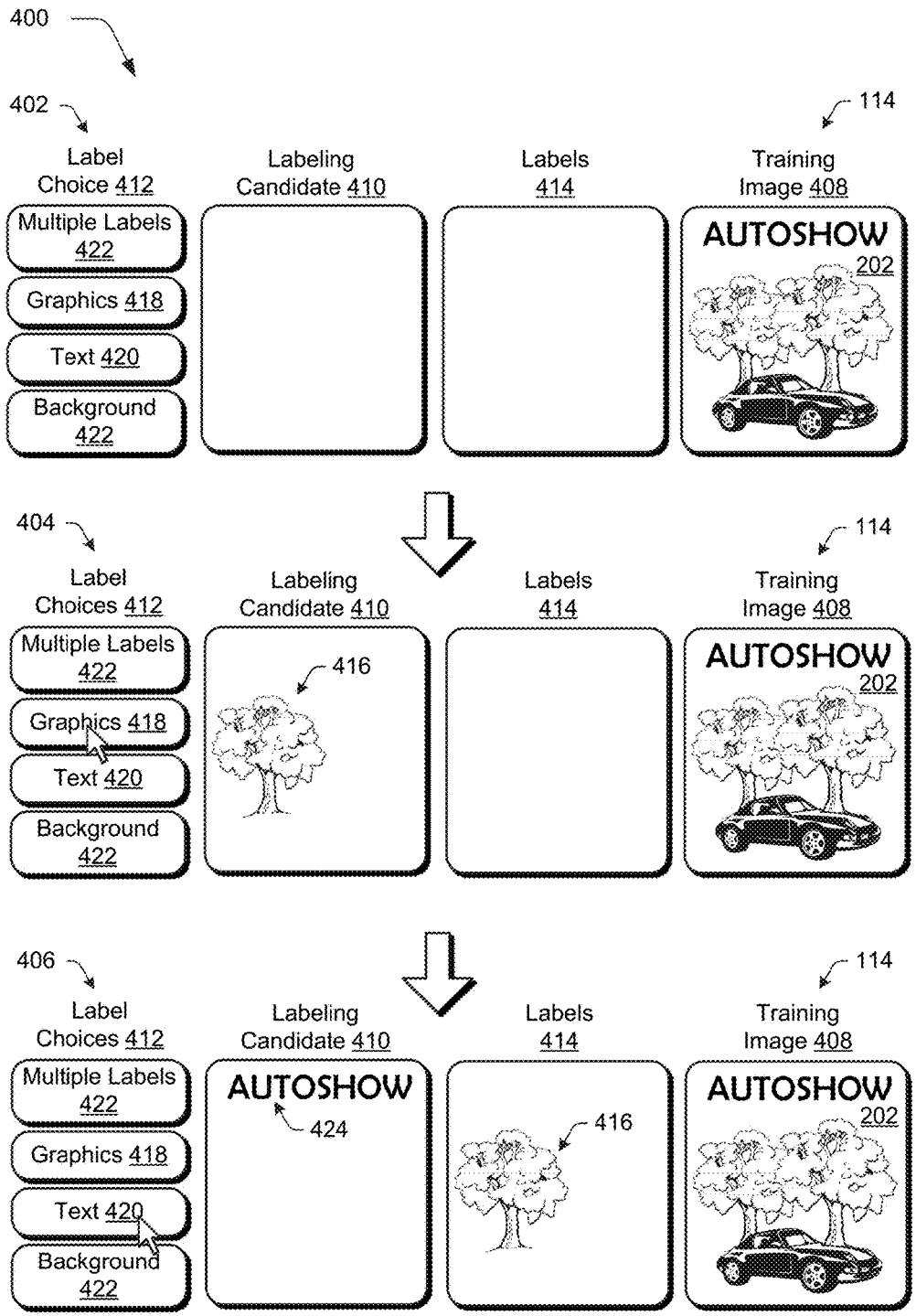
FIG. 4 depicts an example implementation in which interaction with a user interface of FIG. 2 is shown as labeling objects and pixels forming the objects in order to generate training data having increased accuracy in an efficient manner.

FIG. 4 depicts an example implementation 400 in which interaction with a user interface 114 of FIG. 2 is shown as labeling objects and pixels forming the objects in order to generate training data having increased accuracy in an efficient manner. This example implementation 400 is illustrated as using first, second, and third stages 402, 404, 406.

At the first stage 402, the user interface 114 is output that includes a display of a training image 302 section that shows a current training image 202 of FIG. 2 being processed. The training image 302 section is displayed simultaneously with a labeling candidate 410 section that is used to indicate a current object from the image being labels, along with a label choice 412 section indicating which labels are available, and a labels 414 section that includes objects in the training image that are labeled.

The training data generation module 206 leverages a structured object representation 204 of the training image 202 to select objects and thus pixels used to form the objects for labeling. As shown at the second stage 404, for instance, the training data generation module 206 selects a tree 416 from the training image 202, which is shown in the labeling candidate 410 section. This selection may be performed automatically and without user intervention by the training data generation module 206, e.g., by "walking" through a hierarchy of the structured object representation 204. Other examples are also contemplated, such as through selection of an object in the training image 202 of the training image 408 section, e.g., by "clicking" on the tree.

A user selection is made from one of a plurality of labeling options to label the object and corresponding pixels of the object, e.g., through use of a cursor control device, touchscreen functionality, verbal utterance, and so forth. In this example, labeling options include graphics 418, text 420, and background 422. An option is also included to provide multiple labels 422 for an object, e.g., a graphic 418 in the background 422 of the training image 202. In the illustrated example, a user selects a graphics 418 label using a cursor to label the tree 416 accordingly. This label is then assigned to each of the pixels that form that object. Thus, desired labels may be readily generated based on which options are provided in the user interface and used as a basis to label pixels in an image in a dynamic and intuitive manner.

Figure 5:
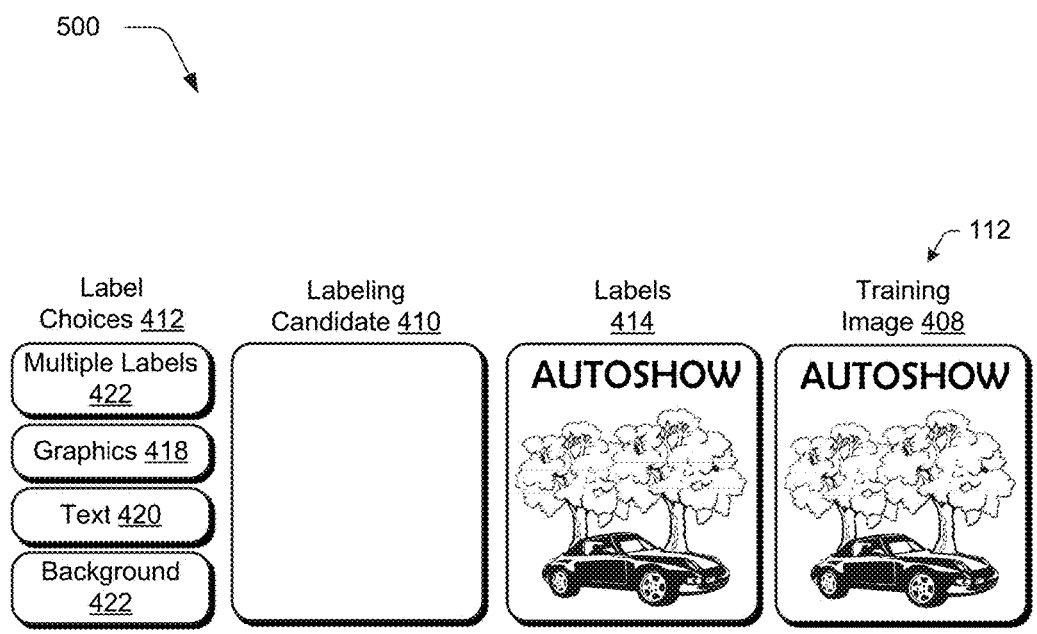
FIG. 5 depict an example of a result of the labeling as performed in relation to FIG. 4.

Once the pixels of the object are labeled, the object in the labeling candidate 410 section (e.g., the tree 416) is moved to the labels 414 section of the user interface 114 and another object is selected from the structured object representation 204, e.g., "autoshow" 424 text in this example. A user then selects the text 420 labeling option, and this process continues until each of the objects and/or a desired number of objects in the image 112 are labeled. An example 500 of this is shown in FIG. 5 in which the labels 414 section includes each of the objects from the training image 202 as is readily identifiable by a user viewing the user interface 114. The selection and labeling continues with additional training images 202 obtained by the training data generation module 206 to arrive at a set of training images 202 having labeled pixels 208.

In this way, the training data generation module 206 supports accurate labeling of pixels through selection of objects from the structured object representation 204 and thus includes just those pixels that pertain to that object. Further, the user interface 114 supports efficient labeling through automatic output of the pixels of those objects and thus avoids the inefficient manual drawing of borders as required in conventional techniques.

The training images 202 having the labeled pixels 208 are then provided to a model training module 210 of FIG. 2. The model training module 210 is implemented at least partially in hardware as logic that includes a machine learning module 212 that is representative of logic implemented at least partially in hardware to perform machine learning to train the labeling module 112. For example, the machine learning module 212 may employ a variety of different types of neural networks to recognize patterns and regularities of pixels and corresponding labels. Thus, once trained the labeling model 112 is used to recognize these patterns and assign corresponding labels from pixels in other images. A variety of types of neural networks may be used, such as a fully convolutional neural networks (FCN), holistic nested networks, fully connected conditional random fields (CRF), and so forth.

The labeling model 112, once trained, is provided to a pixel labeling module 214 that is implemented at least partially in hardware using logic to label pixels, which may be implemented together with training functionality of the pixel labeling system 110 or separately by another device, e.g., a client device of a user. The pixel labeling module 214 employs the labeling model 112 to process an input of a subsequent image 216 to generate a labeled image 218 having labels assigned to individual pixels of the image. Because the labeling model 112 is trained to recognize patterns of pixels as corresponding to particular labels, the subsequent image 216 may take a variety of different forms, such as bitmap images that do not include structured object representations 204. In this way, the structured object representation 204 of the training images 202 may be leveraged to increase accuracy and efficiency of generation of the training images for training a model that may be used to label a variety of other types of images.

The pixels, once labeled, may also support a variety of functionality. Examples of this functionality represented by an image processing module 220 include object removal to remove those pixels that correspond with a particular object, optical character recognition in which pixels are processed that are labeled as corresponding to text, auto layer separation in which different layers are formed from an image for each object included in the image to ease editing of the image, and so forth. For example, auto layer separation may be used based on an identification of which pixels are labelled as corresponding to a foreground and which pixels are labelled as corresponding to a background. These pixels may then be assigned separate layers to support editing, such as to replace a background with another background, object removal, and so forth.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
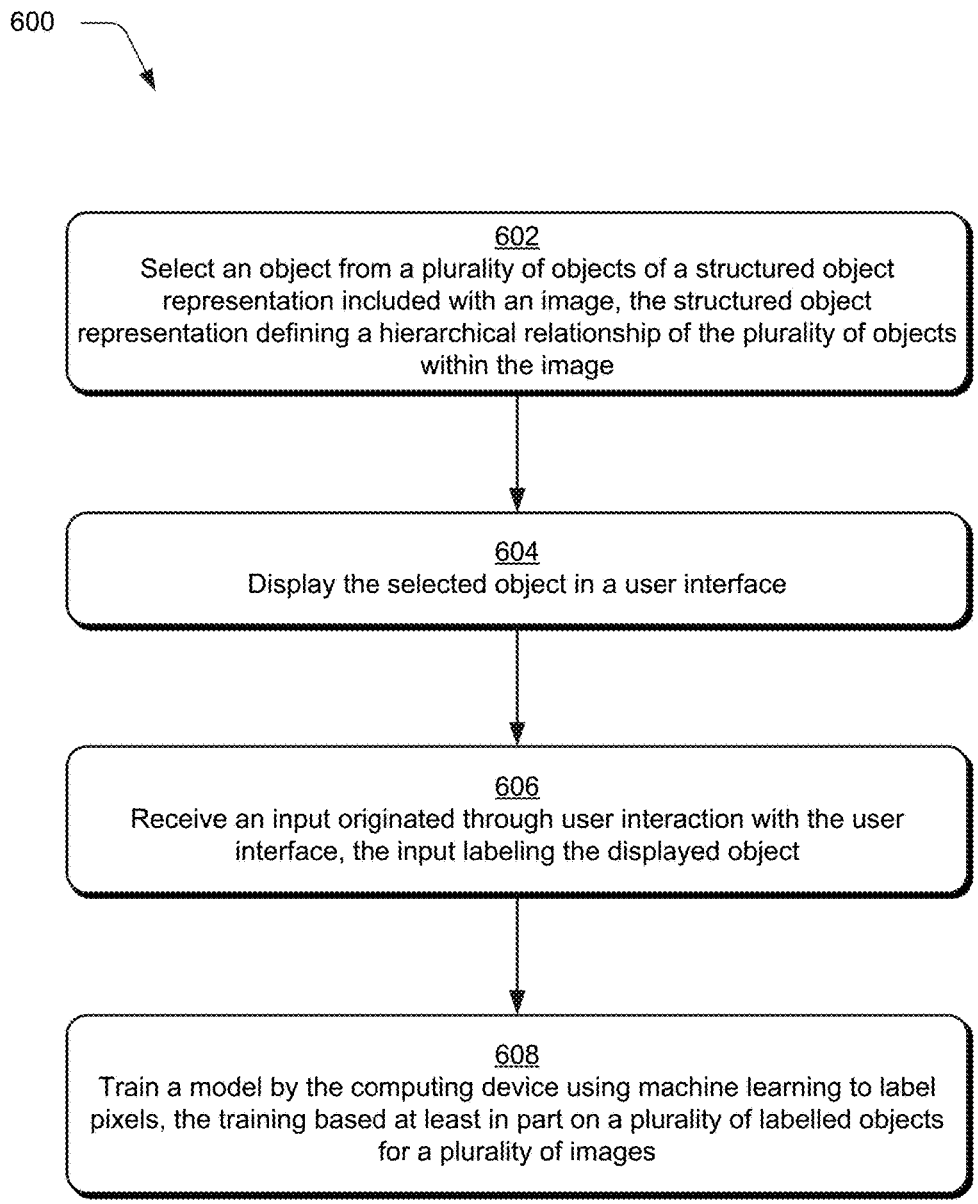
FIG. 6 is a flow diagram depicting a procedure in an example implementation in which training data is generated to train a model using machine learning.

FIG. 6 depicts a procedure 600 in an example implementation in which training data is generated to train a model using machine learning. A digital medium environment is configured to generate improved training data to label pixels. An object is selected form a plurality of objects of a structured representation included with an image. The structured object representation defines a hierarchical relationship of the plurality of objects within the image (block 602). The selected object is then displayed in a user interface (block 704). As shown in FIG. 3, for instance, the structured object representation 204 may be configured as a group of nodes that correspond to respective objects rendered as part of an image 202. A hierarchical relationship is defined in this example that defines membership of sub-objects (e.g., child object) as part of larger "parent" objects, e.g., a trunk and leaves that form a tree.

Inputs are then received that are originated through user interaction with the user interface by the computing device. The inputs label the displayed object (block 604). The inputs, for instance, may be provided using a cursor control device, touchscreen functionality, a spoken utterance, gesture, and so forth to label the object according to one or more desired labels, e.g., as text, a graphical element, background, foreground, and so forth.

A model is trained by the computing device using machine learning. The training is based at least in part on a plurality of labeled objects for a plurality of images (block 606). The training, for instance, may iterate such that objects are selected, displayed, and labeled in succession to form a training set of data. Machine learning is then employed using a neural network to learn patterns of pixels as corresponding to respective labels based on this training set of data. The trained model is then usable to label pixels in images, such as bitmaps, that do not have corresponding structured object representations and may do so with increased accuracy over conventional techniques that rely on flawed training data.

Figure 7:
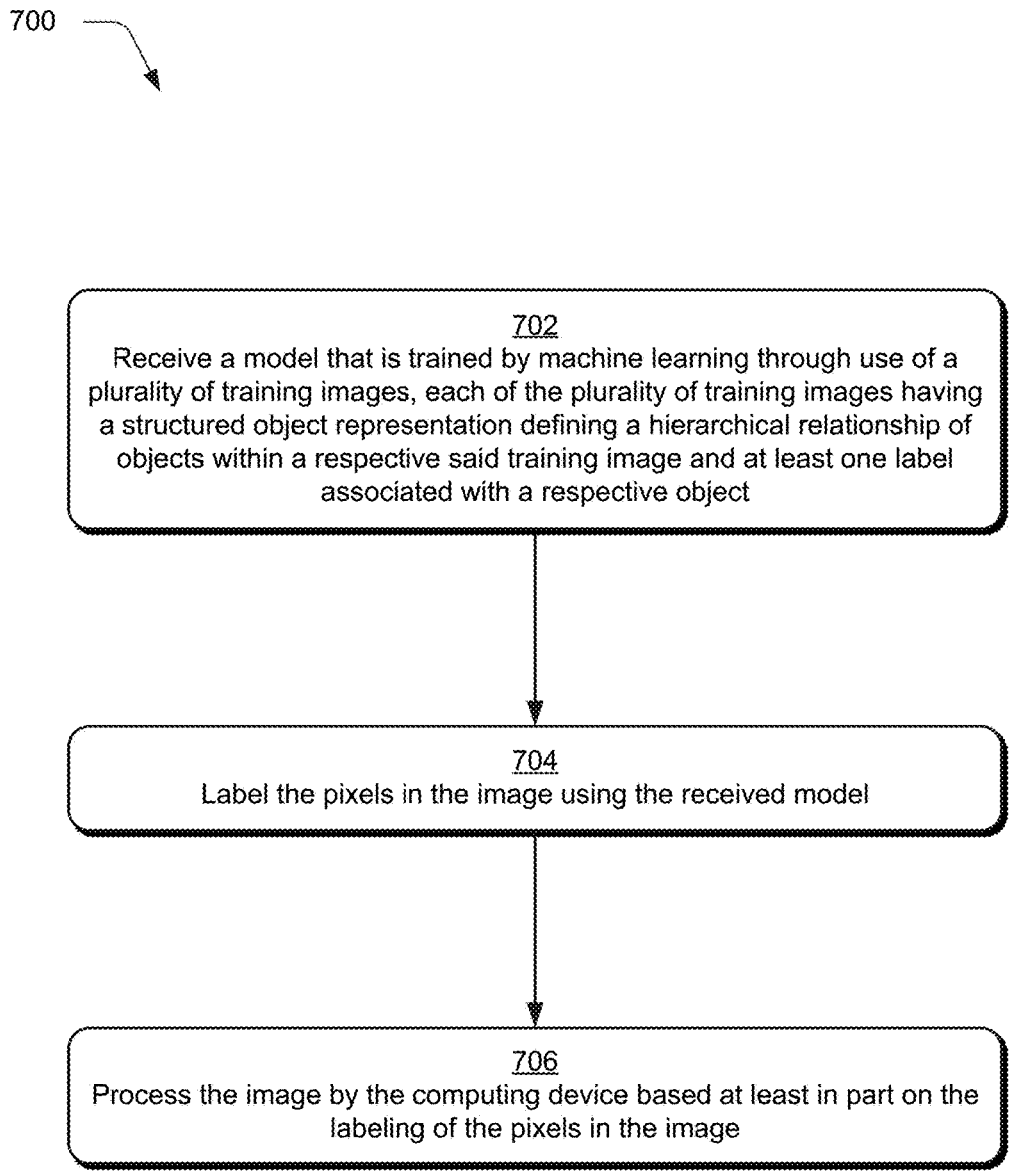
FIG. 7 is a flow diagram depicting a procedure in an example implementation in which a model trained in FIG. 6 is used to label pixels in a subsequent image.

FIG. 7 depicts a procedure 700 in an example implementation in which a trained model is used to label pixels in a subsequent image, such as a bitmap. In this example, a digital medium environment is configured to label pixels in an image based on a model generated using machine learning. First, a model is received that is trained by machine learning through use of a plurality of training images. Each of the plurality of training images have a structured object representation defining a hierarchical relationship of objects within a respective training image and at least one label associated with a respective object. (block 702). The plurality of training images, for instance, may have pixels and corresponding labels associated therewith through use of the user interface 112 of FIG. 4. The training images are then used to train a model to recognize patterns of pixels as corresponding to particular labels.

The pixels in the image are labeled by the computing device using the received model (block 704). The model, for instance, may recognize one or more patterns in the pixels of the image as corresponding to a respective label and label those pixels as such. The image is then processed by the computing device based at least in part on the labeling of the pixels in the image (block 706). A variety of processing may be performed, such as object removal to remove those pixels that correspond with a particular object, optical character recognition in which pixels are processed that are labeled as corresponding to text, auto layer separation in which different layers are formed from an image for each object included in the image to ease editing of the image, and so forth. A variety of other examples are also contemplated as described above.

Example System and Device

Figure 8:
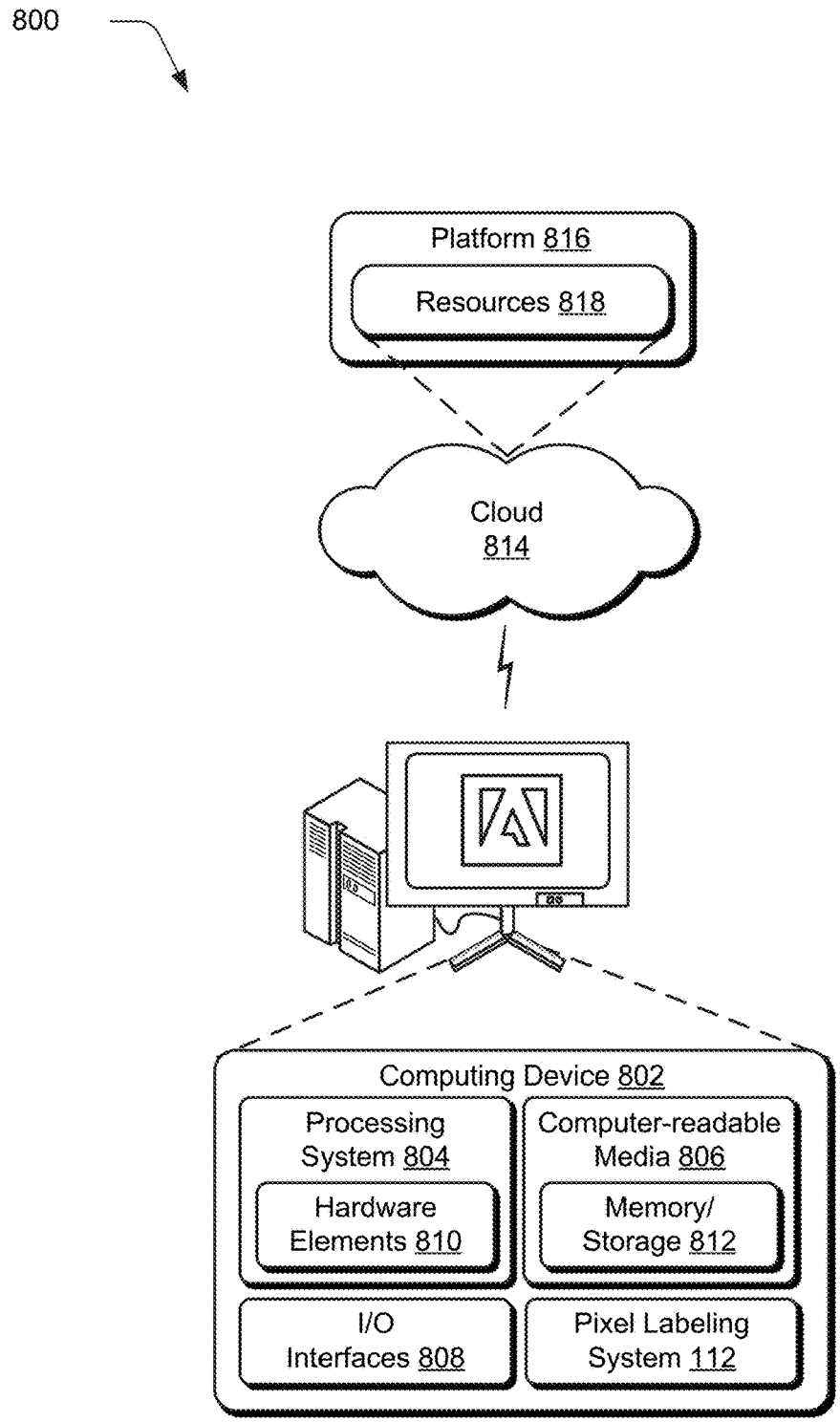
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the pixel labeling system 112. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate improved training data to train a model to label pixels, a method implemented by a computing device, the method comprising:
   receiving, by the computing device, an image including a structured object representation configured according to a markup language or portable document format, the structured object representation defining a hierarchical relationship of a plurality of objects, one to another, to corresponding pixels within the image;
   selecting, by the computing device automatically and without user intervention, an object from the plurality of objects of the structured object representation;
   displaying, by the computing device based on the selecting, the corresponding pixels of the selected object in a user interface;
   labeling, by the computing device, the corresponding pixels based on an input originated through user interaction with the user interface, the input labeling the displayed object; and
   training, by the computing device, a model using machine learning to label pixels, the training based at least in part on the labeling of the corresponding pixels for a plurality of said images.

2. The method as described in claim 1, wherein the labeling of the displayed object causes a respective label of the labelled object to be associated with each pixel of the displayed object.

3. The method as described in claim 1, further comprising labeling pixels in a subsequent image using the trained model, the subsequent image not used as part of the training and not including a structured object representation.

4. The method as described in claim 1, further comprising labeling pixels in a subsequent image using the trained model, the subsequent image formed as a bitmap.

5. The method as described in claim 1, wherein the hierarchical relationship is described using a graph structure in which at least one object of the plurality of objects is defined as including one or more other objects of the plurality of objects.

6. The method as described in claim 5, wherein the graph structure follows a configuration of a scalable vector graphic.

7. The method as described in claim 1, wherein the user interface includes:
   a training image section including a display of the image;
   a labeling candidate section including the display of the object;
   a labels section including a display of a previously labelled object and an indication of respective labels of the previously labelled object; and
   a label choice section having a plurality of portions selectable by a user to initiate the received input to label the displayed object.

8. The method as described in claim 7, wherein the training image section, the labeling candidate section, the labels section, and the label choice section are displayed concurrently in the user interface.

9. The method as described in claim 1, wherein the training by machine learning uses a neural network.

10. In a digital medium environment to label pixels in an image based on a model generated using machine learning, a method implemented by a computing device, the method comprising:
    receiving, by the computing device, the model trained by machine learning through use of a plurality of training images, the model trained by:
        selecting an object from the plurality of objects of a structured object representation configured according to a markup language or portable document format, the structured object representation defining a hierarchical relationship of a plurality of objects, one to another, to corresponding pixels within a training image; and
        labeling the corresponding pixels based on an input originated through user interaction with a user interface that displays the corresponding pixels of the selected object, the input labeling the displayed object; and
    labeling, by the computing device, the pixels in the image by using the received model; and
    processing the image by the computing device based at least in part on the labeling of the pixels in the image.

11. The method as described in claim 10, wherein the structured object representation uses a graph structure in which at least one of the objects is defined as including one or more other ones of the objects.

12. The method as described in claim 10, wherein the machine learning uses a neural network.

13. The method as described in claim 10, wherein the processing of the image includes auto-layer separation, object identification, optical character recognition, font recognition, hole filling, object replacement, or vectorization of the image.

14. The method as described in claim 10, wherein the processing of the image results in a transformation of an appearance of the image.

15. In a digital medium environment to generate improved training data to train a model to label pixels, a system comprising:
    a training data generation module implemented at least partially in hardware to:
        receive a training image including a structured object representation configured according to a markup language or portable document format, the structured object representation defining a hierarchical relationship of a plurality of objects, one to another, to corresponding pixels within the training image;
        select an object from the plurality of objects of the structured object representation;
        display the corresponding pixels of the selected object in a user interface, the user interface including a training image section including a display of the image, a labeling candidate section including the display of the object, a labels section including a display of a previously labelled object and an indication of respective labels of the previously labelled object, and a label choice section having a plurality of portions selectable by a user to initiate the received input to label the displayed object; and
        label the corresponding pixels based on an input originated through user interaction with the user interface, the input labeling the displayed object; and
    a model training module implemented at least partially in hardware to train the model using machine learning, the training based at least in part on the labeling of the corresponding pixels in a plurality of said training images.

16. The system as described in claim 15, further comprising an image processing module implemented at least partially in hardware to label pixels in a subsequent image using the trained model, the subsequent image not used as part of the training and not having a respective structured object representation.

17. The system as described in claim 15, further comprising a pixel labeling module implemented at least partially in hardware to label pixels in a subsequent image using the trained model, the subsequent image formed as a bitmap.

18. The system as described in claim 15, wherein the hierarchical relationship is described using a graph structure in which at least one object of the plurality of objects is defined as including one or more other objects of the plurality of objects.

19. The system as described in claim 15, wherein the machine learning uses a neural network.

\* \* \* \* \*